US006809997B2

(12) United States Patent
Park et al.

(10) Patent No.: US 6,809,997 B2
(45) Date of Patent: Oct. 26, 2004

(54) APPARATUS AND METHOD FOR DETECTING WOBBLE SIGNAL READ FROM OPTICAL DISC

(75) Inventors: Jung Bae Park, Anyang-si (KR); Won Bae Joo, Seoul (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 10/294,818

(22) Filed: Nov. 15, 2002

(65) Prior Publication Data

US 2003/0099172 A1 May 29, 2003

(30) Foreign Application Priority Data

Nov. 17, 2001 (KR) ........................................ 2001-71611
Dec. 13, 2001 (KR) ........................................ 2001-79074

(51) Int. Cl.$^7$ ............................................... G11B 7/00
(52) U.S. Cl. .................. 369/47.1; 369/47.15; 369/59.1; 369/275.4; 369/44.13
(58) Field of Search .............................. 369/47.1, 47.15, 369/47.2, 47.22, 47.27, 47.41, 47.47, 47.46, 47.54, 53.1, 53.16, 53.2, 53.34, 59.1, 59.13, 59.19, 59.2, 59.23, 59.25, 44.13, 275.1, 275.4

(56) References Cited

U.S. PATENT DOCUMENTS 5,646,932 A * 7/1997 Kuribayashi et al. ..... 369/275.3
6,345,018 B1 * 2/2002 Maegawa et al. ........ 369/44.13
6,621,779 B1 * 9/2003 Inokuchi et al. ......... 369/47.51

* cited by examiner

Primary Examiner—Muhammad Edun
(74) Attorney, Agent, or Firm—Birch, Stewart, Kolasch & Birch, LLP

(57) ABSTRACT

An apparatus and method for detecting a wobble signal read from an optical disc. The wobble signal detection apparatus comprises an analog/digital (A/D) converter for A/D-converting an analog wobble signal, read from the optical disc and then band pass filtered, a slope detector for detecting a slope of the A/D-converted wobble signal according to a variation thereof, and a wobble signal detector for detecting a peak point of the A/D-converted wobble signal using the detected wobble signal slope, and detecting/outputting a square-wave wobble signal with a high level or low level transition at the detected peak point. The slope detector calculates variations of data values of the A/D-converted wobble signal sampled within a predetermined period on the basis of predetermined different weights, accumulates the calculated values and detects the slope of the A/D-converted wobble signal on the basis of the accumulated value. The predetermined period is an interval where at least two wobble signal data samples are obtained. Therefore, a stable wobble signal can be detected even though a low-frequency fluctuation component and DC offset component are introduced into the analog wobble signal read from the optical disc or the analog wobble signal varies in amplitude.

20 Claims, 18 Drawing Sheets

Wobble Signal Slicing Method

Peak Detected Wobble Signal

APPARATUS AND METHOD FOR DETECTING WOBBLE SIGNAL READ FROM OPTICAL DISC

BACKGROUND OF THE INVENTION

1. Field of the Invention

The present invention relates to an apparatus and method for detecting a wobble signal read from an optical disc such as a writable compact disc (CD) or digital versatile disc (DVD).

2. Description of the Related Art

It is common that a writable optical disc, such as a digital versatile disc-random access memory (DVD-RAM) or digital versatile disc-re-writable (DVD-RW), has grooves formed along spiral or concentric tracks. Here, portions of the optical disc other than the grooves are typically called lands. Data can be recorded on only any one or both of each groove and each land according to a writing method. A specific variation is applied to a wall of each groove in a groove formation process, and a specific frequency signal is generated based on the specific variation in a recording/reproduction process, so it can be used as auxiliary clock means. Here, the specific variation is called a wobble and the specific frequency signal is called a wobble signal.

FIG. 1 shows the construction of a conventional apparatus for detecting a wobble signal read from an optical disc. As shown in this drawing, the conventional wobble signal detection apparatus comprises a band pass filter (BPF) 10 for filtering a push-pull signal, or an analog wobble signal, read from a writable optical disc, for example, a DVD-RW at a predetermined frequency band to remove a high-frequency noise component, a direct current (DC) offset component, etc. therefrom. An analog/digital (A/D) converter (ADC) 11 is provided to A/D-convert an output analog wobble signal of the predetermined frequency band from the band pass filter 10 to output a digital wobble signal. A wobble signal detector 12 acts to slice the A/D-converted digital wobble signal on the basis of a predetermined reference level, for example, a zero level to detect/output a square-wave wobble signal. A wobble phase locked loop (PLL) 100 is provided to output a wobble PLL clock synchronized with the square-wave wobble signal. FIG. 2 shows measured waveforms of the filtered wobble signal from the band pass filter 10, the sliced wobble signal from the wobble signal detector 12 and the PLL clock from the wobble phase locked loop 100.

The conventional wobble signal detection apparatus further comprises a bit detector 16 for detecting/converting the square-wave wobble signal into a stream of bits having values of 1 or 0, using the wobble PLL clock. A synchronous (Sync) detector 17 acts to detect a synchronous pattern placed in the square-wave wobble signal from the bit stream and generate and output a synchronous signal corresponding to the detected synchronous pattern. An address decoder 18 is provided to decode a physical address of the optical disc from the bit stream on the basis of the synchronous signal.

The wobble PLL 100 includes a phase error detector 13 for detecting a phase error at a point of time that the A/D-converted wobble signal crosses a zero point from positive to negative, namely, a negative zero crossing point (referred to hereinafter as 'NZCP') as shown in FIG. 3. A time count value that determines an oscillating frequency of a digital controlled oscillator (DCO) 15 in the wobble PLL 100, for example, a free down time count value, is always corrected with the phase error detected at the NZCP.

At this time, in a case (lead case) where the phase of the PLL clock, which is generated by the digital controlled oscillator 15, is ahead of that of the A/D-converted wobble signal, the phase error detector 13 detects/generates a positive phase error as shown in FIG. 3 and outputs the generated phase error to a loop filter 14 in the wobble PLL 100. The loop filter 14 then corrects a time count value for determination of a clock frequency of the digital controlled oscillator 15 into a smaller value according to the positive phase error.

On the other hand, in a case (lag case) where the phase of the PLL clock generated by the digital controlled oscillator 15 is behind that of the A/D-converted wobble signal, the phase error detector 13 detects/generates a negative phase error as shown in FIG. 3 and outputs the generated phase error to the loop filter 14, which then corrects the time count for determination of the clock frequency of the digital controlled oscillator 15 into a larger value according to the negative phase error.

As a result, the wobble PLL 100 continuously performs a phase error correction operation for synchronization of the PLL clock with the wobble signal by detecting a phase error at the NZCP and correcting the time count for determination of the clock frequency of the digital controlled oscillator 15 on the basis of the detected phase error.

However, recently, as the optical disc becomes higher in recording density, recording tracks thereof have denser pitches, resulting in a greater crosstalk effect caused by a wobble signal of an adjacent track. This greater crosstalk effect makes the output wobble signal from the band pass filter 10 very small in signal to noise (S/N) ratio, so a stable wobble signal cannot be detected by the conventional wobble signal detection apparatus.

In addition, provided that a tracking servo and focusing servo are unstable or a surface vibration of the optical disc, etc. occur, a low-frequency fluctuation component and DC offset component will be introduced into the output wobble signal from the band pass filter 10 or the wobble signal will vary in amplitude. For example, as shown in FIG. 4, in the case ① where a stable wobble signal with a constant amplitude is outputted from the band pass filter 10, a stable wobble signal ④ is normally detected by the wobble signal detector 12. Alternatively, in the case ② where a low-frequency fluctuation component and DC offset component are contained in the output wobble signal from the band pass filter 10, or in the case ③ where the output wobble signal from the band pass filter 10 has a varying amplitude and DC offset component, an abnormal wobble signal ⑤ or ⑥ is detected by the wobble signal detector 12. Consequently, the wobble phase locked loop cannot normally perform the phase error correction operation.

SUMMARY OF THE INVENTION

Therefore, the present invention has been made in view of the above problems, and it is an object of the present invention to provide an apparatus and method for detecting a stable wobble signal even though a low-frequency fluctuation component and DC offset component are introduced into an analog wobble signal read from an optical disc or the analog wobble signal varies in amplitude.

In accordance with one aspect of the present invention, the above and other objects can be accomplished by the provision of a wobble signal detection apparatus comprising analog/digital (A/D) conversion means for A/D-converting an analog wobble signal, read from an optical disc and then band pass filtered; slope detection means for detecting a slope of the A/D-converted wobble signal according to a variation thereof; and wobble signal detection means for detecting a peak point of the A/D-converted wobble signal using the detected wobble signal slope, and detecting/outputting a square-wave wobble signal with a high level or low level transition at the detected peak point; the slope detection means calculating variations of data values of the A/D-converted wobble signal sampled within a predetermined period on the basis of predetermined different weights, accumulating the calculated values and detecting the slope of the A/D-converted wobble signal on the basis of the accumulated value, the predetermined period being an interval where at least two wobble signal data samples are obtained.

In accordance with another aspect of the present invention, there is provided a wobble signal detection method comprising the steps of a) band pass filtering and A/D-converting an analog wobble signal read from an optical disc, and detecting a slope of the A/D-converted wobble signal; b) detecting a peak point of the A/D-converted wobble signal using the detected wobble signal slope; and c) detecting/outputting a square-wave wobble signal with a high level or low level transition at the detected peak point; the step a) of detecting the wobble signal slope including the step of comparing data values of the A/D-converted wobble signal sampled within a predetermined period with an arbitrary reference wobble signal data value, respectively, obtaining the respective differences as a result of the comparisons, multiplying the obtained differences by different weights, respectively, accumulating the multiplied values, comparing the accumulated value with a predetermined threshold value, and detecting the wobble signal slope in accordance with the compared result.

In accordance with a further aspect of the present invention, there is provided a wobble signal detection method comprising the steps of a) band pass filtering an analog wobble signal read from an optical disc, and A/D-converting the filtered wobble signal into a digital wobble signal; b) detecting a peak point of the A/D-converted digital wobble signal; c) determining whether a counted value obtained by frequency-counting an interval between the detected wobble signal peak point and a just previously detected wobble signal peak point corresponds to a bit length of an integer multiple of 3; and d) initializing the counted value if it corresponds to the bit length of the integer multiple of 3, performing a re-counting operation, and detecting/outputting a square-wave wobble signal with a high level or low level transition at a point of time that a re-counted value corresponds to a desired bit length.

In accordance with yet another aspect of the present invention, there is provided a wobble signal detection apparatus comprising A/D conversion means for A/D-converting an analog wobble signal, read from an optical disc and then band pass filtered; slope detection means for detecting a slope of the A/D-converted wobble signal according to a variation thereof; peak detection means for detecting a peak point of the A/D-converted wobble signal using the detected wobble signal slope; counting means for frequency-counting an interval between the detected wobble signal peak point and a just previously detected wobble signal peak point; and level transition means for, if a counted value obtained by frequency-counting the interval between the detected wobble signal peak point and the just previously detected wobble signal peak point corresponds to a bit length of an integer multiple of 3, initializing the counted value, and making a high level or low level transition at a point of time that a re-counted value corresponds to a desired bit length.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 5:
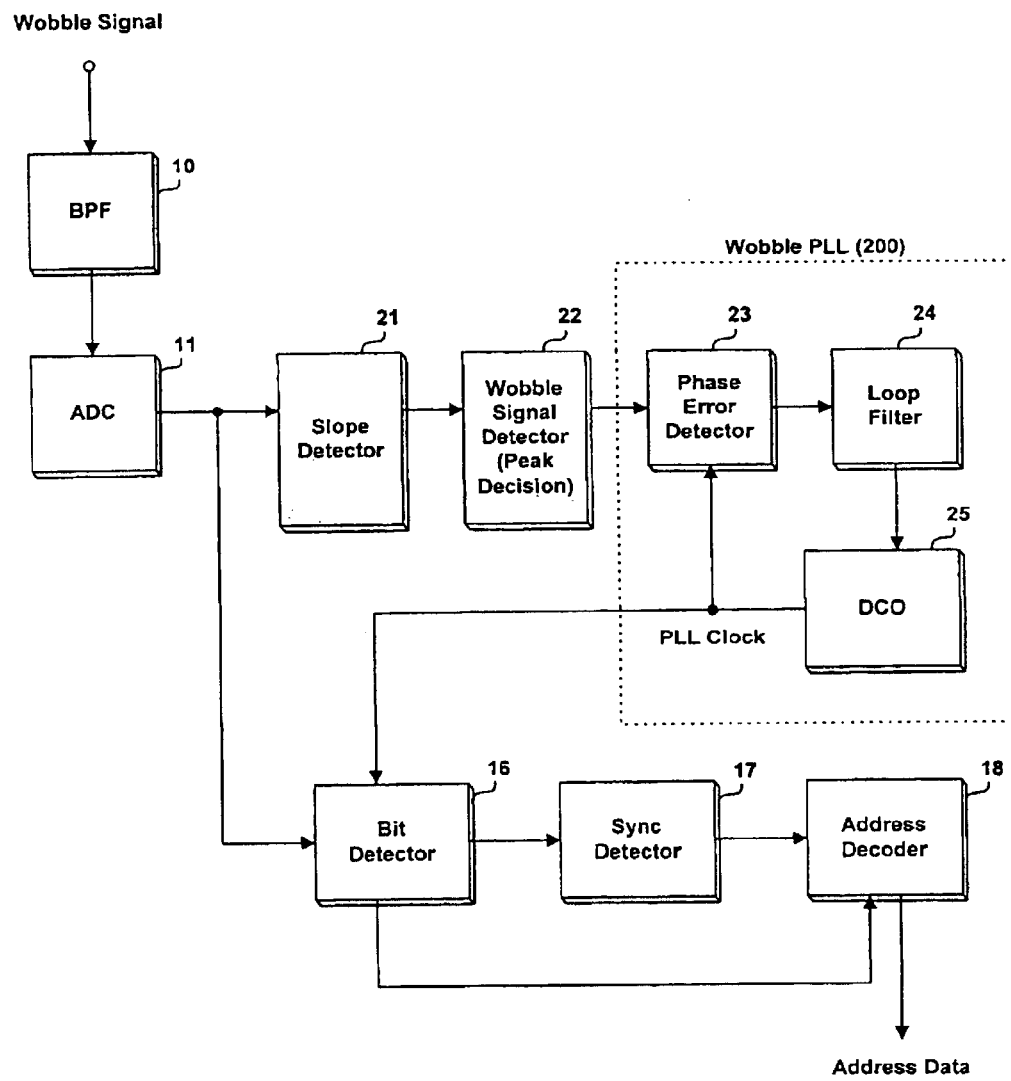
FIG. 5 is a block diagram showing the construction of an apparatus for detecting a wobble signal read from an optical disc in accordance with a preferred embodiment of the present invention.

With reference to FIG. 5, there is shown in block form the construction of an apparatus for detecting a wobble signal read from an optical disc in accordance with a preferred embodiment of the present invention.

Figure 1:
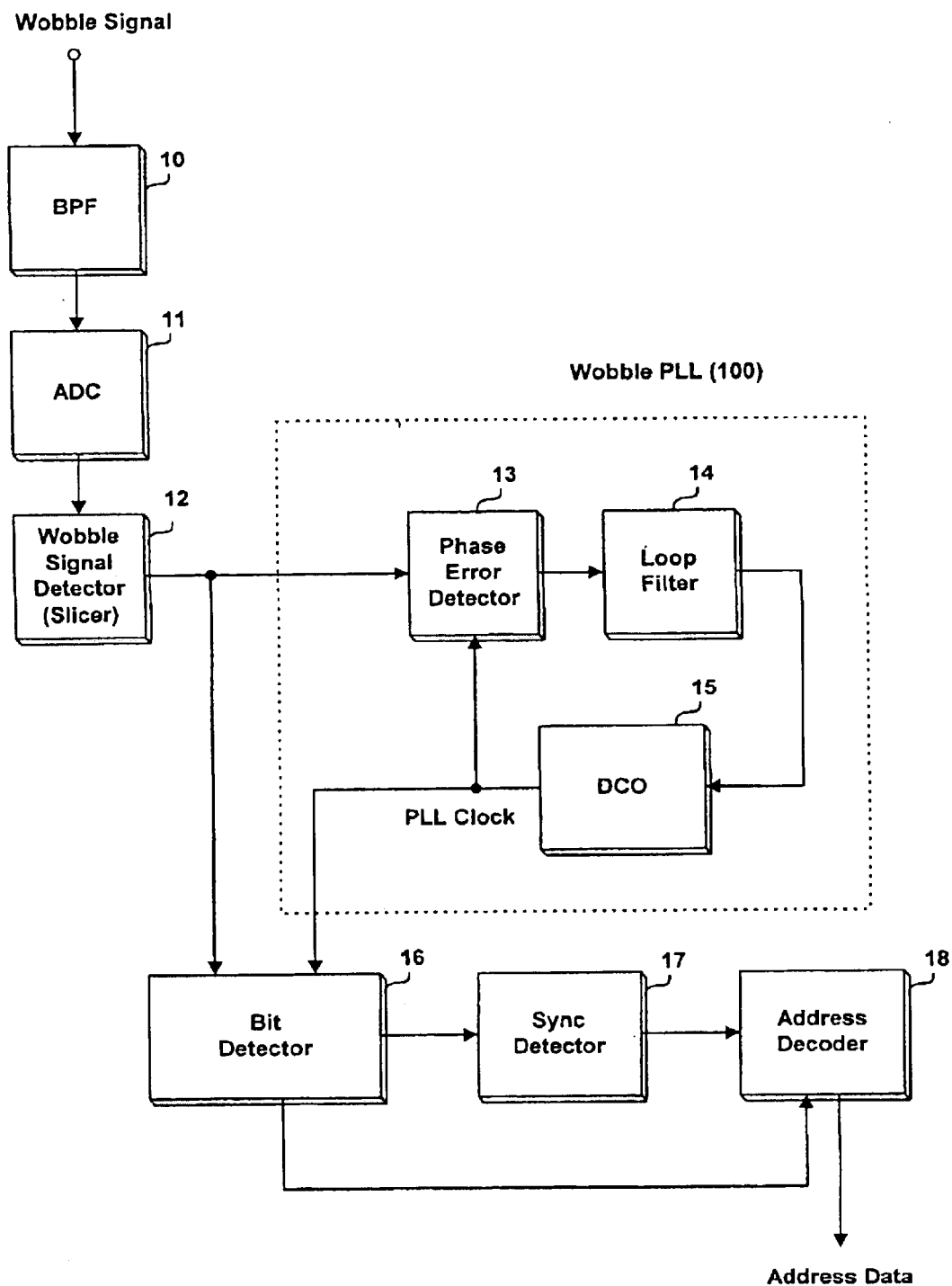
FIG. 1 is a block diagram showing the construction of a conventional apparatus for detecting a wobble signal read from an optical disc.
Figure 2:
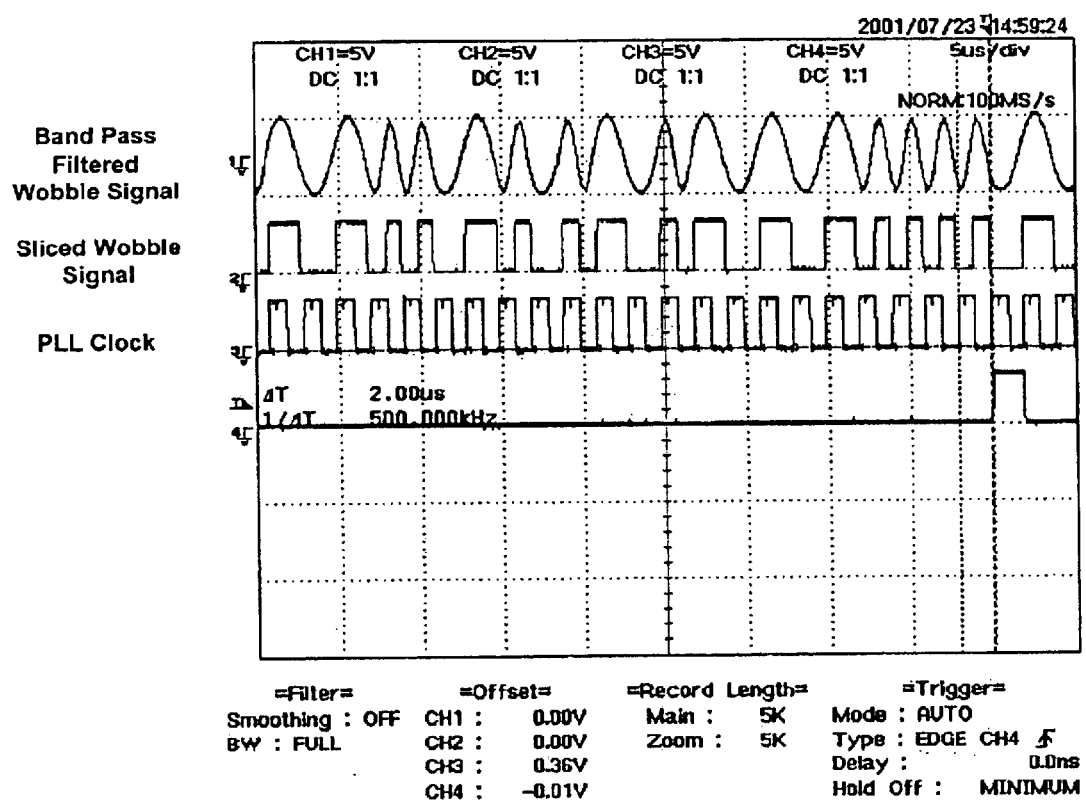
FIG. 2 is a waveform diagram of signals detected by the conventional apparatus of FIG. 1.
Figure 3:
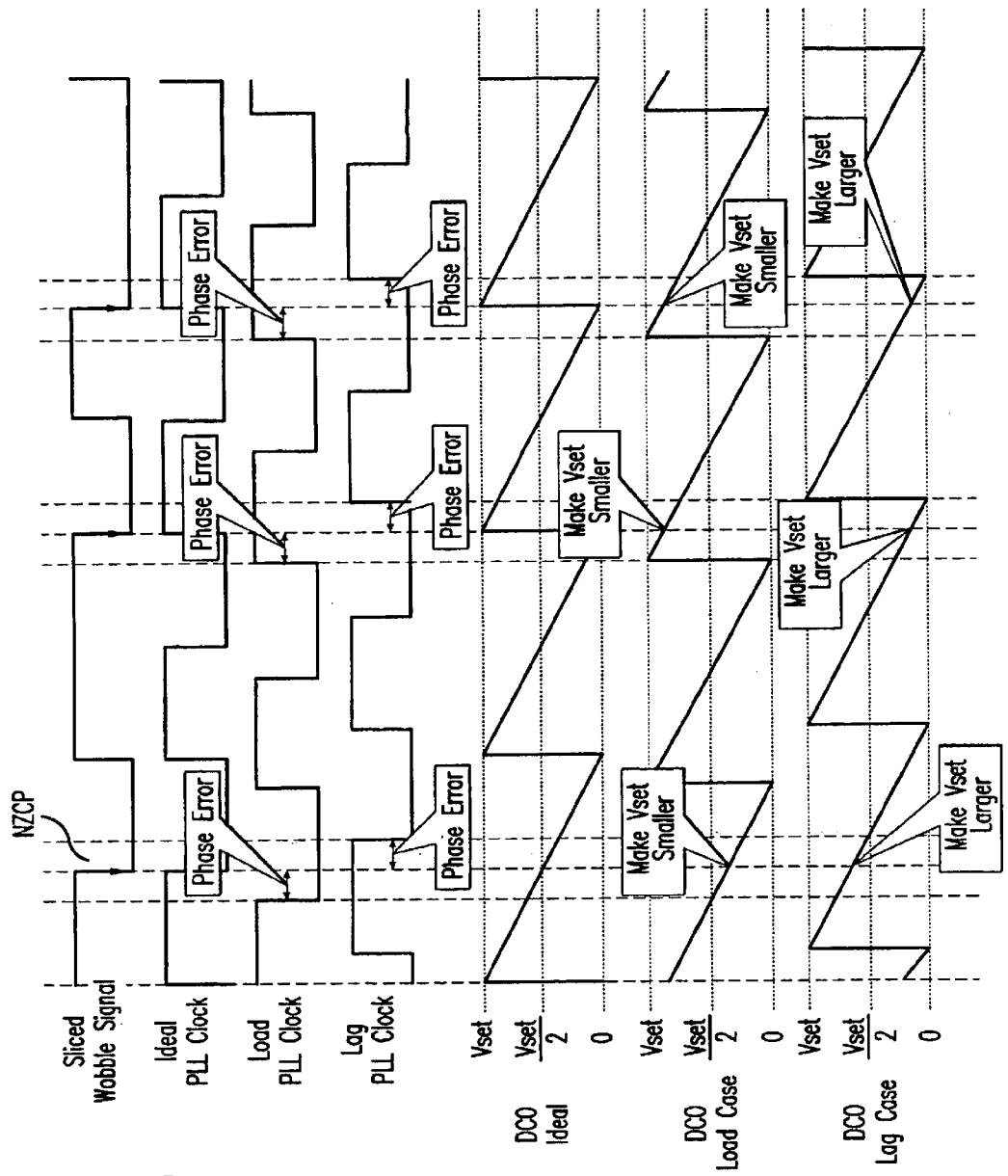
FIG. 3 is a waveform diagram of a phase error, PLL clock and digital controlled oscillator time count in a wobble PLL in FIG. 1.
Figure 4:
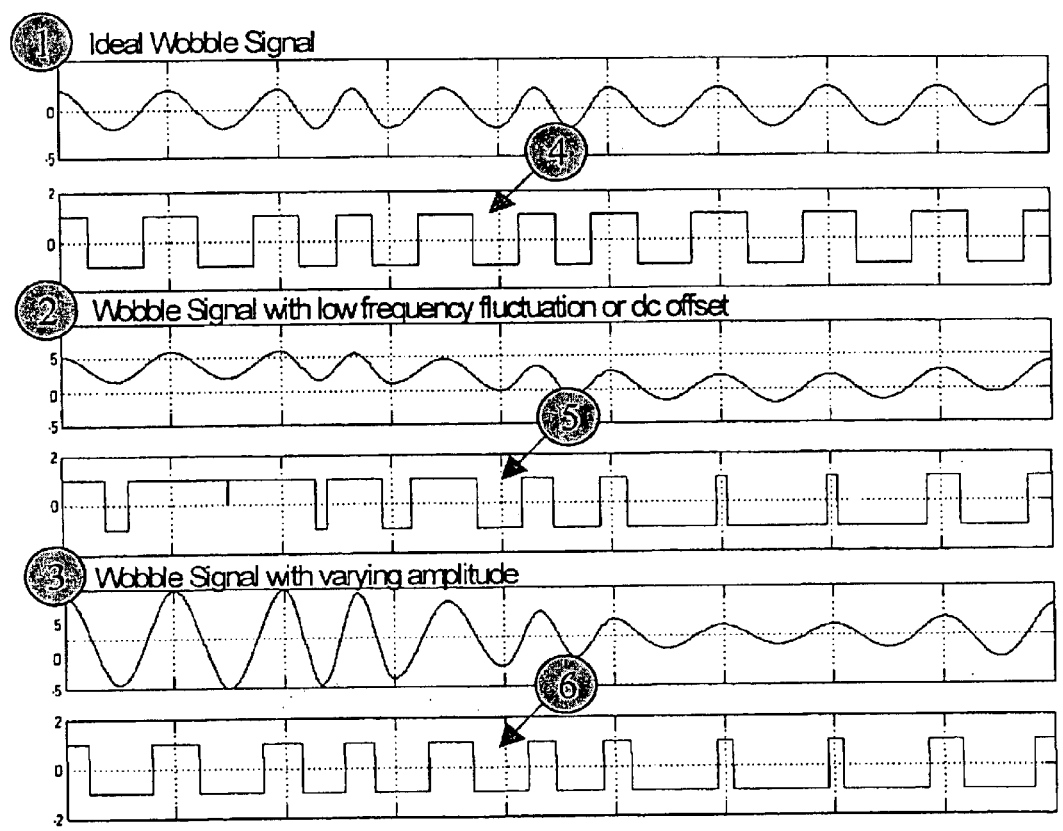
FIG. 4 is a waveform diagram of wobble signals abnormally detected by a wobble signal detector in FIG. 1.

As shown in FIG. 5, the wobble signal detection apparatus comprises a slope detector 21 for detecting a positive slope and negative slope of a wobble signal, A/D-converted converted as stated previously with reference to FIG. 1, and a wobble signal detector 22 for detecting/deciding a peak point of the A/D-converted wobble signal on the basis of the positive slope and negative slope and detecting/outputting a square-wave wobble signal with a high level or low level transition at the decided peak point.

The wobble signal detection apparatus further comprises a wobble PLL 200 including a phase error detector 23, loop filter 24 and digital controlled oscillator 25. The phase error detector 23 compares/calculates a phase error between an output PLL clock from the digital controlled oscillator 25 and the square-wave wobble signal with the level transition at the peak point. The loop filter 24 filters an output phase error value from the phase error detector 23 to generate a phase correction value. The digital controlled oscillator 25 corrects a current PLL clock oscillating frequency according to the phase correction value generated by the loop filter 24 to output the PLL clock.

The PLL clock generated and outputted by the wobble PLL 200 is also applied to the bit detector 16 to which the A/D-converted wobble signal is inputted. The bit detector 16 detects/converts the A/D-converted wobble signal into a stream of bits having values of 1 or 0, using the PLL clock. The synchronous detector 17 detects a synchronous pattern placed in the A/D-converted wobble signal from the bit stream and generates and outputs a synchronous signal corresponding to the detected synchronous pattern. The address decoder 18 decodes a physical address of the optical disc from the bit stream from the bit detector 16 on the basis of the synchronous signal from the synchronous detector 17.

A detailed description will hereinafter be given of the wobble signal detection operation performed by the slope detector 21 and wobble signal detector 22.

Figure 6:
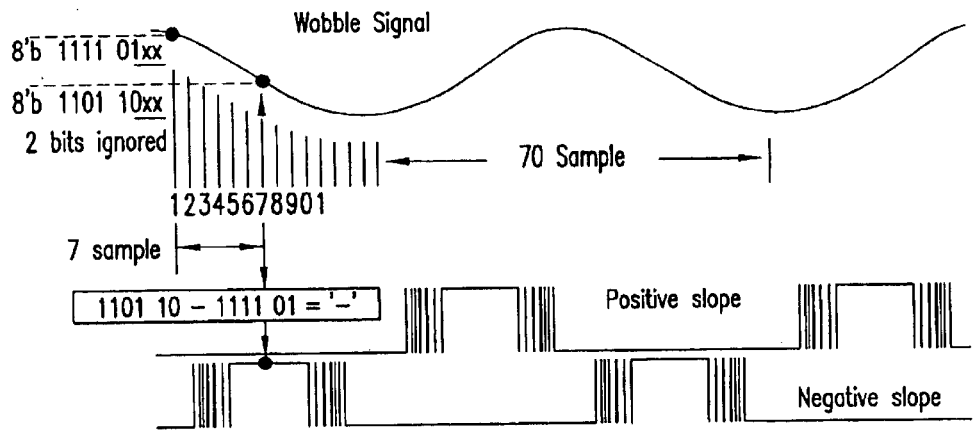
FIG. 6 is a waveform diagram illustrating a wobble signal slope detection process in accordance with the embodiment of the present invention.
Figure 7:
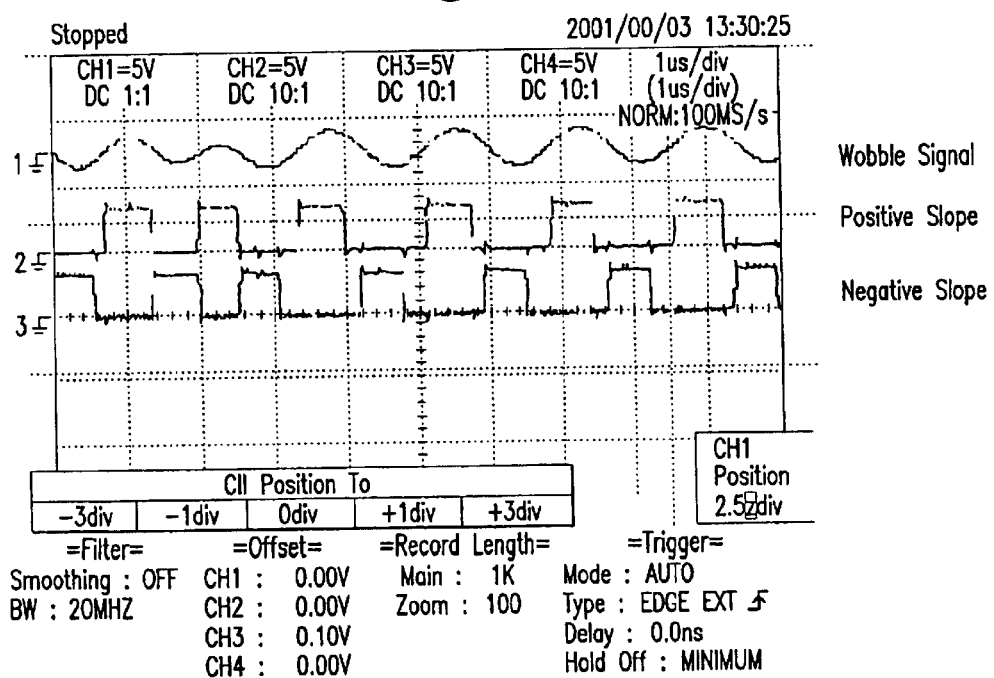
FIG. 7 is a waveform diagram of wobble signal slope detection signals in accordance with the embodiment of the present invention.

FIG. 6 is a waveform diagram illustrating a wobble signal slope detection process in accordance with the embodiment of the present invention, and FIG. 7 is a waveform diagram of wobble signal slope detection signals in accordance with the embodiment of the present invention. As shown in FIG. 6, an output analog wobble signal from the band pass filter 10 is A/D-converted by the A/D converter 11 and then inputted to the slope detector 21. In order to remove a high-frequency noise component mixed in the A/D-converted wobble signal, the slope detector 21 compares a value of the currently A/D-converted digital wobble signal data with that of digital wobble signal data A/D-converted before a predetermined period of time (for example, 10% of a wobble signal period), not the just previously A/D-converted digital wobble signal data, to obtain a difference between the two values. The slope detector 21 then detects a slope of the wobble signal if the obtained difference is greater than or equal to a predetermined threshold value, for example, 2 bits. For example, assume that 70 wobble signal data samples are obtained during one wobble signal period, as shown in FIG. 6. In this case, if the currently A/D-converted digital wobble signal data is '1101 10XX' (XX are ignored) and digital wobble signal data sampled before 10% of the wobble signal period, namely, wobble signal data sampled before 7 samples is '1111 01XX' (XX are ignored), the compared result (1101 10XX–1111 01XX) is a negative (−) value indicative of a difference of 2 or more bits. As a result, the slope detector 21 detects a negative slope of the wobble signal. To the contrary, in the case where the compared result is a positive (+) value indicative of a difference of 2 or more bits, the slope detector 21 detects a positive slope of the wobble signal. Accordingly, the slope detector 21 detects/outputs, as shown in FIG. 6, a negative slope detection signal which becomes high in level when the compared result is a negative (−) value, and a positive slope detection signal which becomes high in level when the compared result is a positive (+) value, respectively.

Hence, the positive slope detection signal and the negative slope detection signal inputted to the wobble signal detector 22 have different waveforms as shown in FIG. 7.

Figure 8:
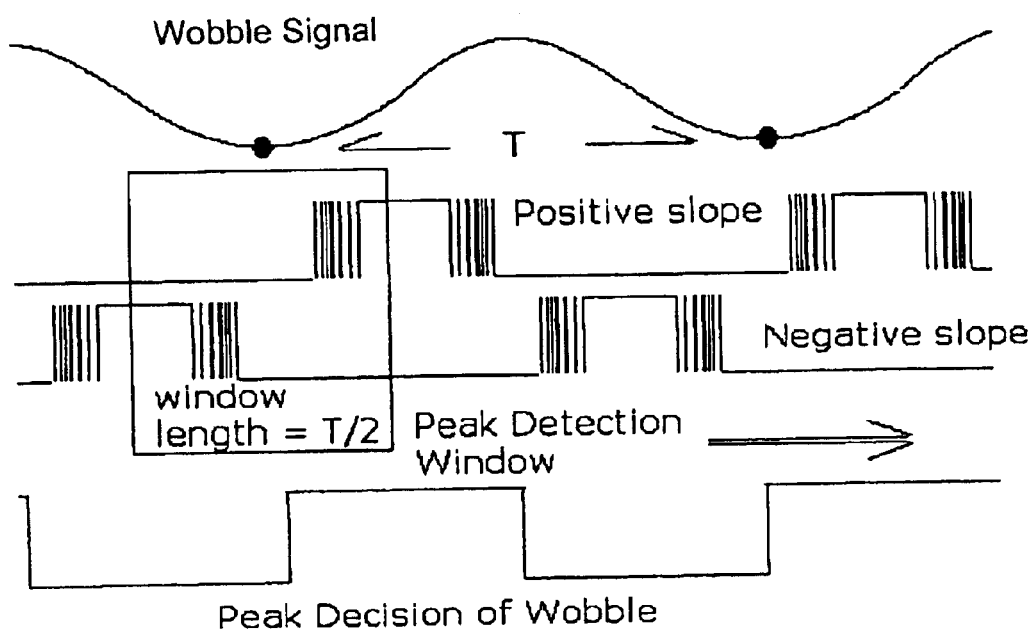
FIG. 8 is a waveform diagram illustrating a wobble signal peak detection process in accordance with the embodiment of the present invention.
Figure 9:
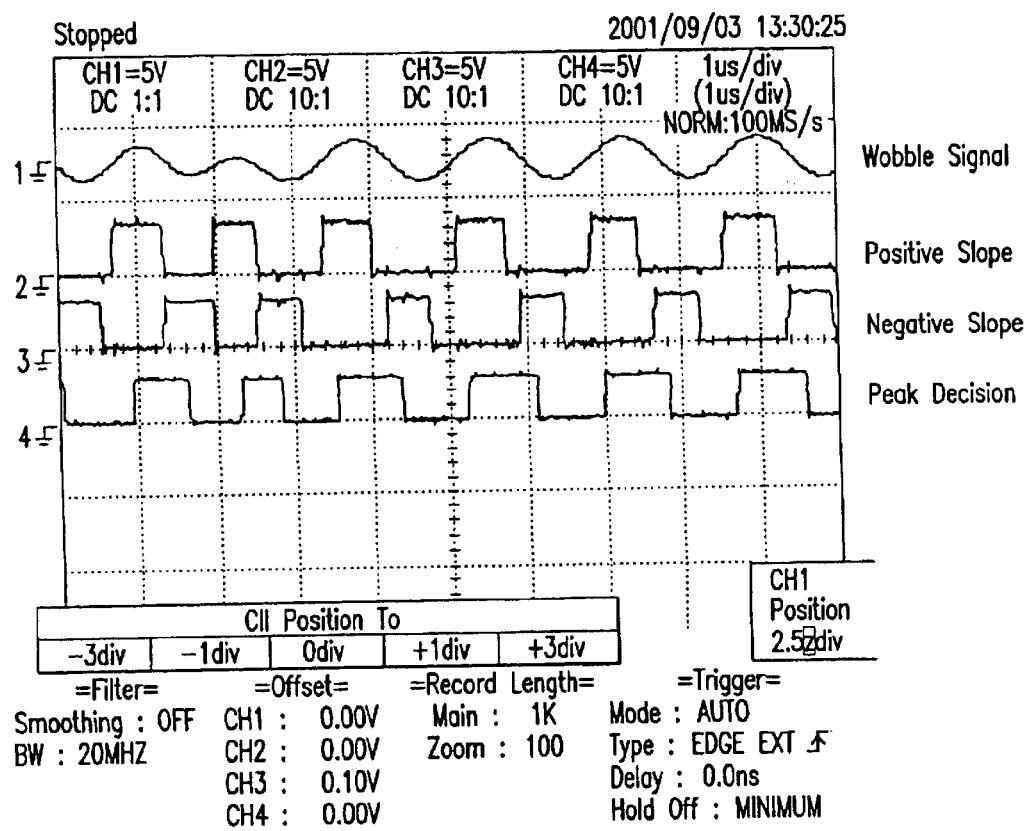
FIG. 9 is a waveform diagram of a wobble signal peak detection signal in accordance with the embodiment of the present invention.

FIG. 8 is a waveform diagram illustrating a wobble signal peak detection process in accordance with the embodiment of the present invention, and FIG. 9 is a waveform diagram of a wobble signal peak detection signal in accordance with the embodiment of the present invention.

Upon receiving the positive slope detection signal and negative slope detection signal as stated above, the wobble signal detector 22 creates a virtual window having a certain length, and accumulates positive slope values and negative slope values existing within the created window, respectively. The length of the window is preferably set to ½ (T/2) of one wobble signal period (1 T).

Then, the wobble signal detector 22 compares the accumulated positive slope value and the accumulated negative slope value with each other, and outputs a high signal if the accumulated positive slope value is greater than the accumulated negative slope value and a low signal if the accumulated positive slope value is not greater than the accumulated negative slope value.

As a result, the wobble signal detector 22 detects/decides a peak point of the analog wobble signal in response to the positive slope detection signal and negative slope detection signal and outputs a square-wave wobble signal with a high level or low level transition at the decided peak point. The analog wobble signal, the positive slope, the negative slope, and the wobble signal outputted from the wobble signal detector have waveforms as shown in FIG. 9, respectively.

Figure 10:
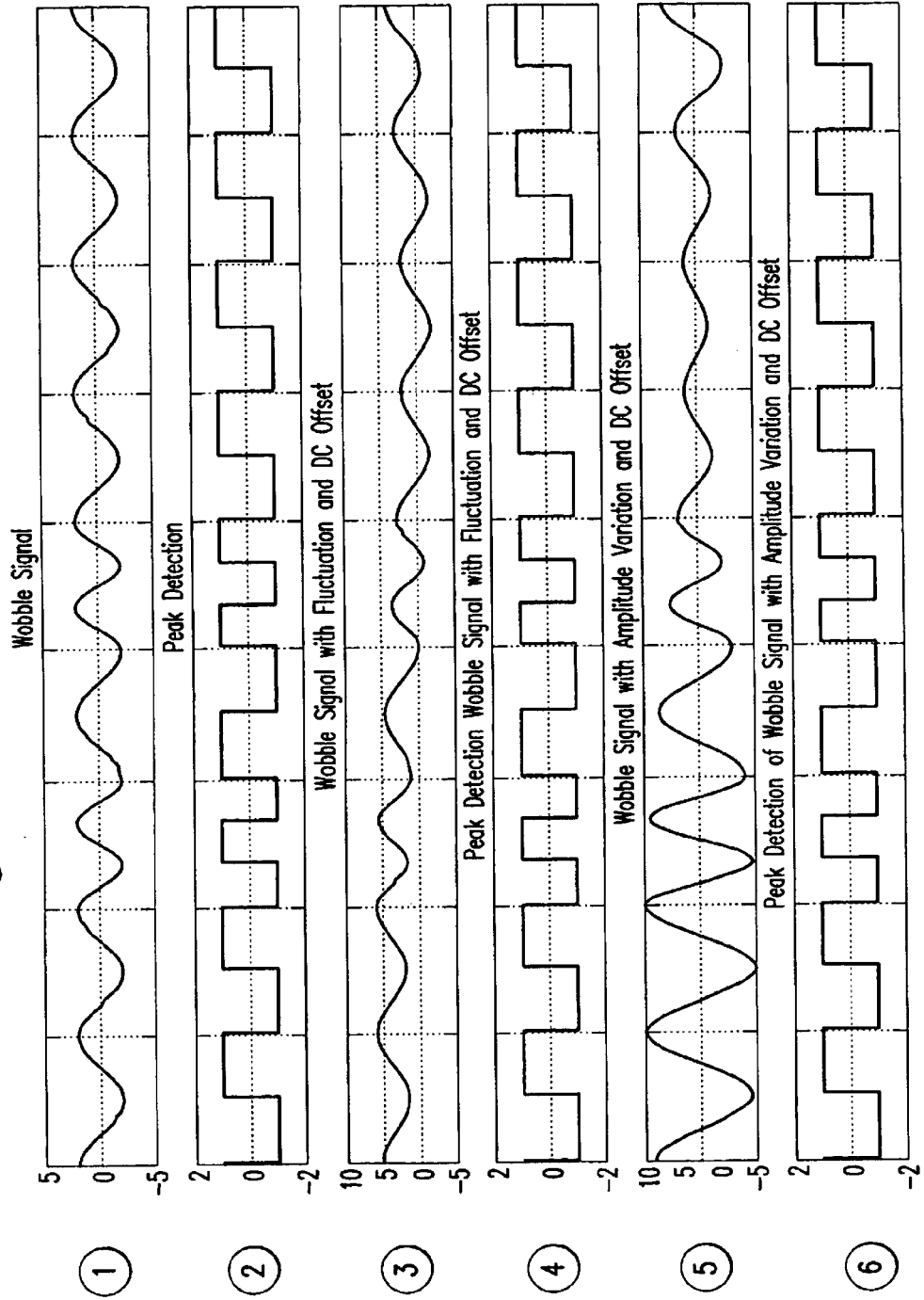
FIG. 10 is a waveform diagram of wobble signals normally detected by the wobble signal detection apparatus and method in accordance with the embodiment of the present invention.

Therefore, in accordance with the preferred embodiment of the present invention, as shown in FIG. 10, in the case ①' where a stable wobble signal with a constant amplitude is outputted from the band pass filter, a stable wobble signal ②' with a level transition at a peak point of the output wobble signal from the band pass filter is normally detected by the wobble signal detector 22. Further, even in the case ③' where a low-frequency fluctuation component and DC offset component are contained in the output wobble signal from the band pass filter, or in the case ⑤' where the output wobble signal from the band pass filter has a varying amplitude and DC offset component, a stable wobble signal ④' or ⑥' with a level transition at a peak point of the output wobble signal from the band pass filter is detected/outputted by the wobble signal detector 22.

On the other hand, in the case where a notch-shaped or spark-shaped high-frequency noise component is contained in the filtered analog wobble signal from the band pass filter 10, a slope detection error of the wobble signal may occur due to the high-frequency noise component. A slope detection method for preventing such a slope detection error will hereinafter be described in detail with reference to the annexed drawings.

Figure 11:
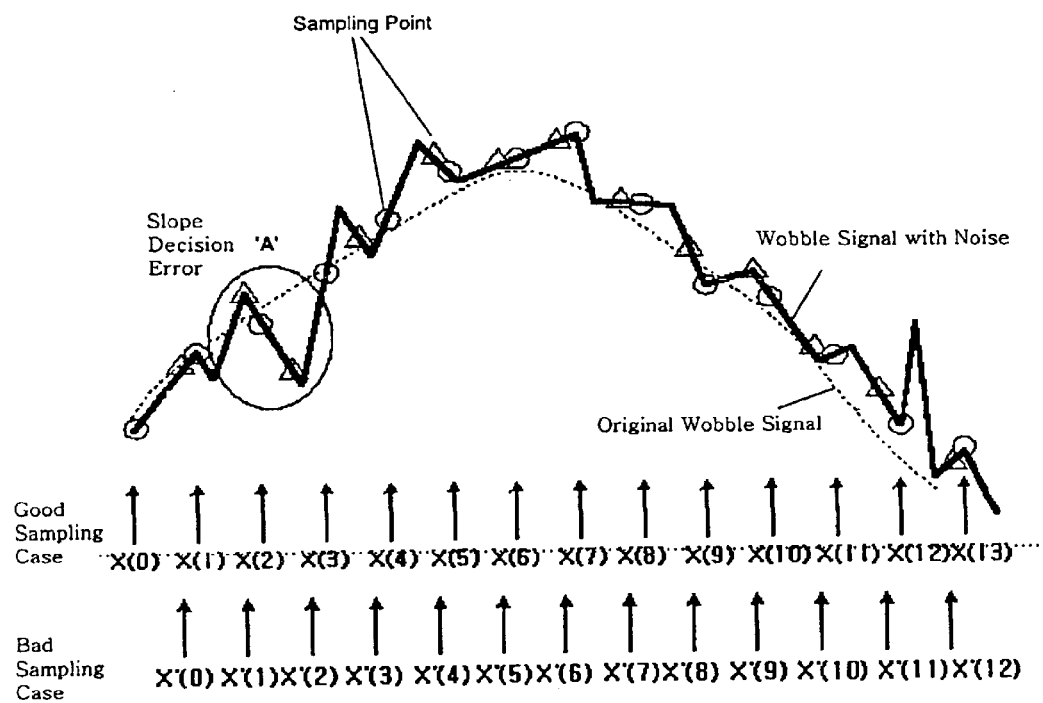
FIG. 11 is a waveform diagram illustrating a state where a high-frequency noise component is contained in a wobble signal inputted to a slope detector in accordance with the embodiment of the present invention.

As shown in FIG. 11, in the case where a high-frequency noise component is introduced into an analog wobble signal (indicated by a dotted line), it is filtered by the band pass filter 10 and then inputted as a wobble signal (indicated by a solid line) with a notch-shaped or spark-shaped high-frequency noise component to the A/D converter 11.

As a result, wobble signal data sampled and A/D-converted by the A/D converter 11 has values irregularly incremented and decremented due to the notch-shaped or spark-shaped noise component. For example, as shown in FIG. 11, in a case (good sampling case) where wobble signal data values obtained by sampling the wobble signal with the high-frequency noise component are X(0)~X(n), wobble signal data corresponding to the original wobble signal is normally outputted to the slope detector 21. However, in a case (bad sampling case) where wobble signal data values obtained by sampling the wobble signal with the notch-shaped or spark-shaped high-frequency noise component are X'(0)~X'(n), wobble signal data different from the original wobble signal is outputted to the slope detector 21.

In other words, as shown in an interval 'A' in FIG. 11, the (n+2)th sampled wobble signal data value X'(1) is larger than the (n+3)th sampled wobble signal data value X'(2). As a result, when a slope is determined on the basis of the comparison between the wobble signal data values at the two points, the slope is erroneously detected as a slope where the wobble signal decreases, although the original wobble signal increases.

Figure 12:
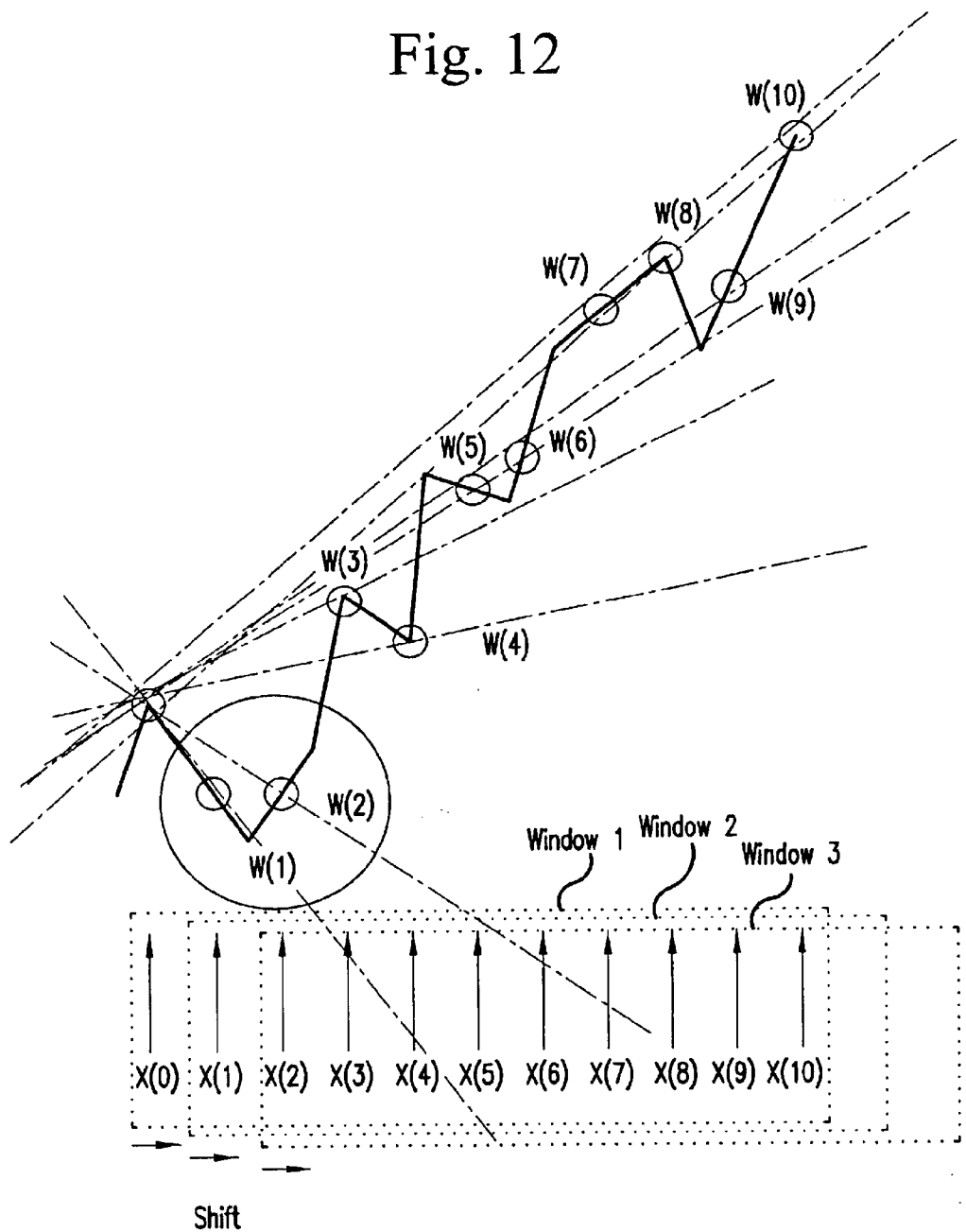
FIG. 12 is a waveform diagram illustrating a different example of the wobble signal slope detection process in accordance with the embodiment of the present invention.

Therefore, the slope detector 21, as shown in FIG. 12, creates a window having a certain interval, for example, an interval where 11 wobble signal data values X(0)~X(10) are sampled, sets the first wobble signal data value X(0) sampled within the created window as a reference wobble signal data value, compares the set reference wobble signal data value with each of the subsequent wobble signal data values X(1)~X(10) sequentially sampled within the window, obtains the respective differences as a result of the comparisons, and multiplies the obtained differences by different weights W(1)~W(10), respectively.

Then, the slope detector 21 accumulates all values obtained by multiplying the differences, respectively, by the different weights W(1)~W(10), compares the accumulated value with a predetermined positive threshold value for positive slope detection and a predetermined negative threshold value for negative slope detection, respectively, and detects/outputs a positive slope and negative slope of the wobble signal within the window in accordance with the compared results.

The weights W(1)~W(10) are preferably preset to values (W(1)<W(2) ... W(9)<W(10)) which increase in proportion to time differences or spaced distances between the reference wobble signal data value X(0) first sampled within the window and the subsequent wobble signal data values X(1)~X(10) sequentially sampled within the window.

If a wobble signal slope is detected within a given window Window 1, then the above wobble signal slope detection process shifts to a next window Window 2, as shown in FIG. 12.

Accordingly, the slope detector 21 repeats a sequence of operations of setting the first wobble signal data value X(1) sampled within the shifted window Window 2 as a reference wobble signal data value, comparing the set reference wobble signal data value with each of the subsequent wobble signal data values X(2)~X(11) sequentially sampled within the shifted window, obtaining the respective differences as a result of the comparisons, and multiplying the obtained differences by different weights, respectively, as expressed by the following equation:

$$Sp(k) = \sum_{i=1}^{N} \{[x(i) - X(0) > 0]? \ w(i):0\}$$

$$Sn(k) = \sum_{i=1}^{N} \{[x(i) - X(0) > 0]? \ -w(i):0\}$$

$$y(k) = Sp(k) + Sn(k)$$

| if(y(k) < Nth)? | Slope(k) = Negative |
| else if(Nth < y(k) < Pth) ? | Slope(k) = Zero |
| else if(Pth < y(k) ) | Slope(k) = Positive |

Here, N is the size of data to be accumulated, X(n) is sampled data, X(0) is sampled reference data, W(n) is a weight to a slope based on two sampled data, Sp(k) is a value obtained by accumulating positive slope weights of respective sampled data on the basis of X(0), Sn(k) is a value obtained by accumulating negative slope weights of the respective sampled data on the basis of X(0), Pth is a positive threshold value, Nth is a negative threshold value, and Slope(n) is a slope at X(0).

Figure 13:
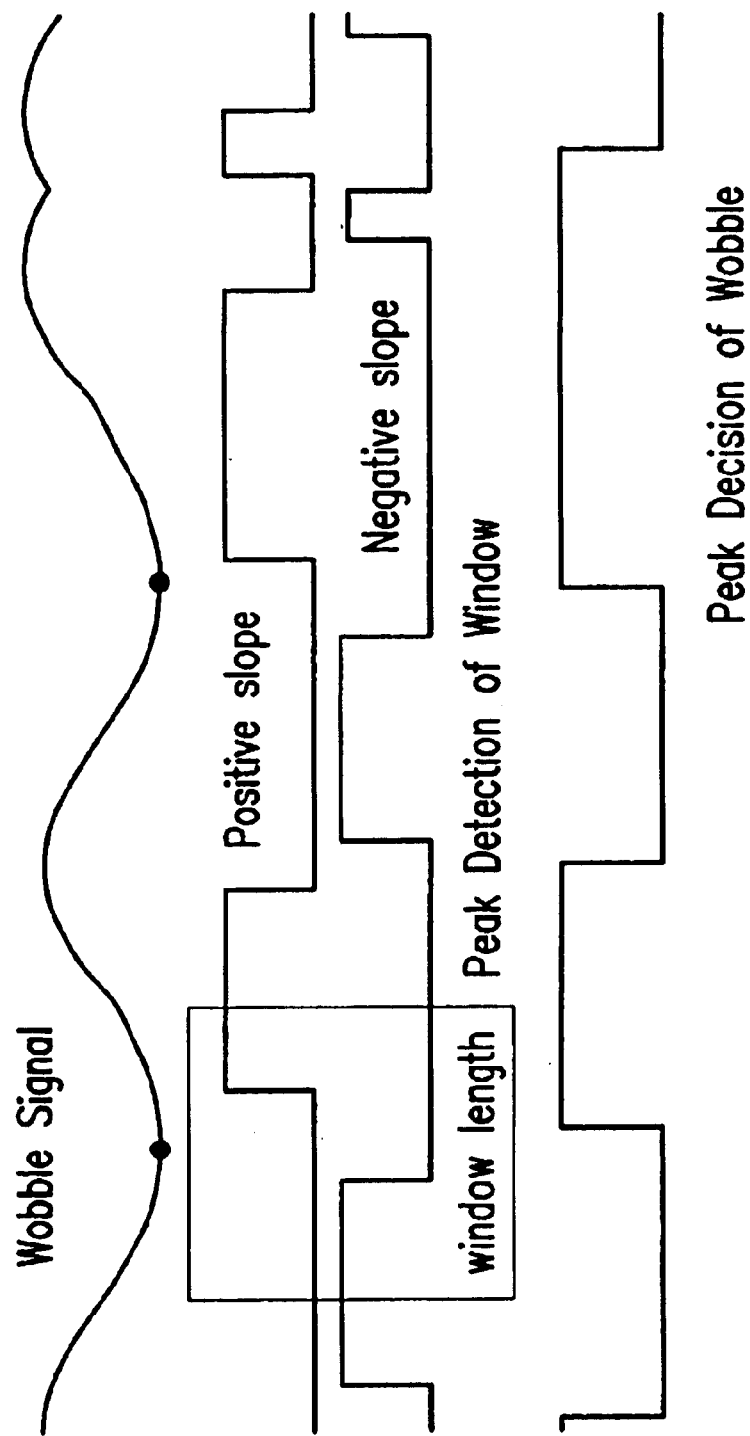
FIG. 13 is a waveform diagram of wobble signal slope detection signals generated according to the example of FIG. 12.

Hence, the positive slope detection signal and negative slope detection signal detected/outputted by the above-described equation and operation have stable waveforms with no high-frequency noise component as shown in FIG. 13, so the wobble signal detector 22 can detect a peak point more accurately in the wobble signal peak detection process previously stated with reference to FIG. 8. Therefore, even in the case where the notch-shaped or spark-shaped high-frequency noise component is contained in the analog wobble signal, a slope detection error of the wobble signal due to the high-frequency noise component can be prevented from occurring.

The present embodiment has been disclosed for illustrative purposes, and the slope detector 21, wobble signal detector 22 and phase error detector 23 may be integrated to configure a single unit.

Figure 14:
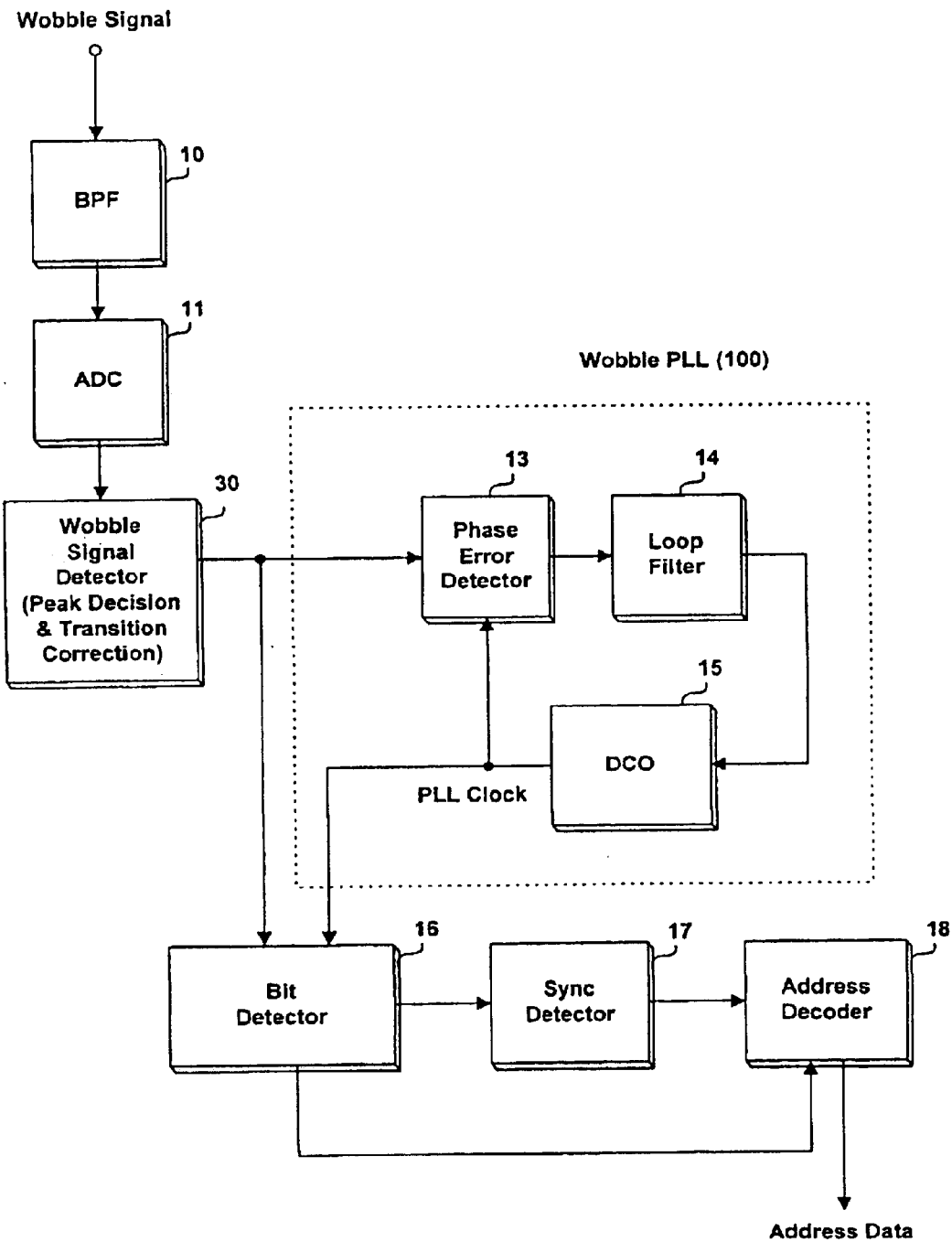
FIG. 14 is a block diagram showing the construction of an apparatus for detecting a wobble signal read from an optical disc in accordance with an alternative embodiment of the present invention.

FIG. 14 shows the construction of an apparatus for detecting a wobble signal read from an optical disc in accordance with an alternative embodiment of the present invention. In this drawing, the same parts as those in FIG. 1 are denoted by the same reference numerals and a detailed description thereof will hereinafter be omitted.

Figure 15:
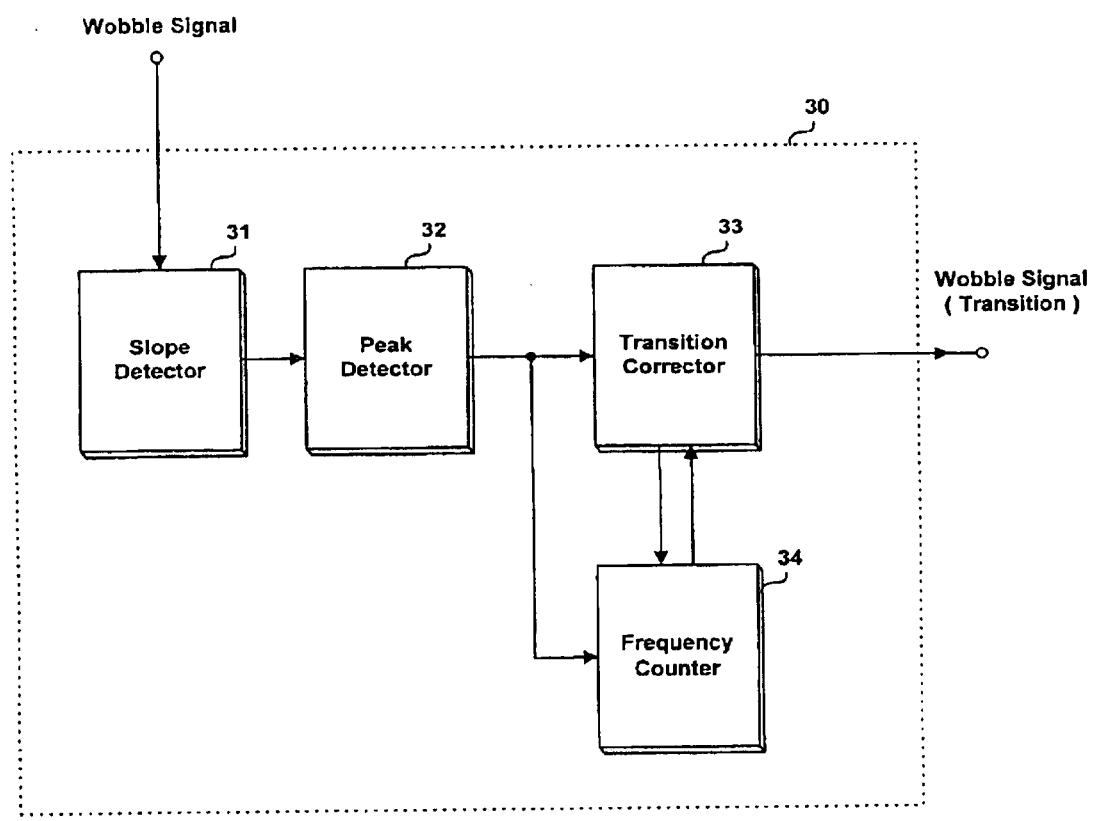
FIG. 15 is a detailed block diagram of a wobble signal detector in FIG. 14.

A wobble signal detector 30 in the second embodiment includes, as shown in FIG. 15, a slope detector 31, peak detector 32, level transition corrector 33 and frequency counter 34.

The slope detector 31 detects a slope of a digital wobble signal A/D-converted by the A/D converter 11. The peak detector 32 detects a peak point of the digital wobble signal using the detected wobble signal slope. The frequency counter 34 frequency-counts an interval between the peak point detected by the peak detector 32 and the just previously detected peak point and outputs the counted value to the level transition corrector 33. If the counted value is a bit length which is an integer multiple of 2, for example, a 2 T or 4 T length defined in a writable optical disc such as a DVD-RW, the level transition corrector 33 makes a high or low level transition based on the wobble signal slope at the peak point detected by the peak detector 32. In the case where the counted value is a bit length which is an integer multiple of 3, for example, a 3 T length, the level transition corrector 33 resets the counted value to resume the counting operation of the frequency counter 34, and then makes a high or low level transition at a point of time that the re-counted value becomes a 1 T length.

Therefore, even though the A/D-converted digital wobble signal contains a low-frequency fluctuation component, a DC offset component and an amplitude variation, the wobble signal detector 30 can detect a stable wobble signal. In particular, the wobble signal detector 30 can detect/output a square-wave wobble signal with a bit length of an integer multiple of 2 which is capable of making the address decoding easier.

Figure 16:
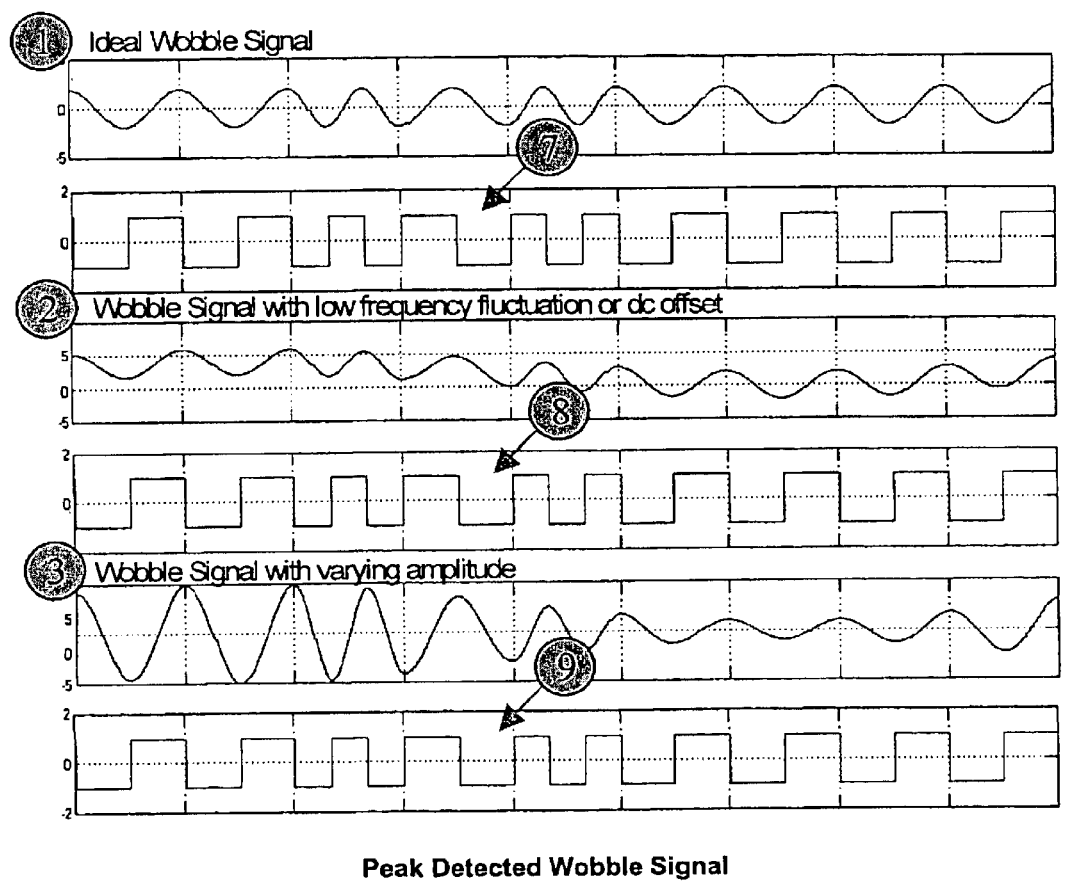
FIG. 16 is a waveform diagram of wobble signals detected by the wobble signal detection apparatus in accordance with the second embodiment of the present invention.

For example, as shown in FIG. 16, in the case ① where the digital wobble signal inputted to the wobble signal detector 30 is a stable wobble signal with a constant amplitude, the peak detector 32 in the wobble signal detector 30 detects a peak point of the digital wobble signal according to a slope variation thereof and normally detects a stable square-wave wobble signal ⑦ on the basis of the detected peak point. Further, even in the case ② where a low-frequency fluctuation component and DC offset component are contained in the digital wobble signal, or in the case ③ where the digital wobble signal has a varying amplitude, the peak detector 32 normally detects a stable square-wave wobble signal ⑧ or ⑨ on the basis of a peak point of the digital wobble signal.

On the other hand, the level transition corrector 33 receives the square-wave wobble signal detected/outputted from the peak detector 32 and outputs a square-wave wobble signal with a pulse width of a bit length of an integer multiple of 2, as will hereinafter be described in detail.

Figure 17:
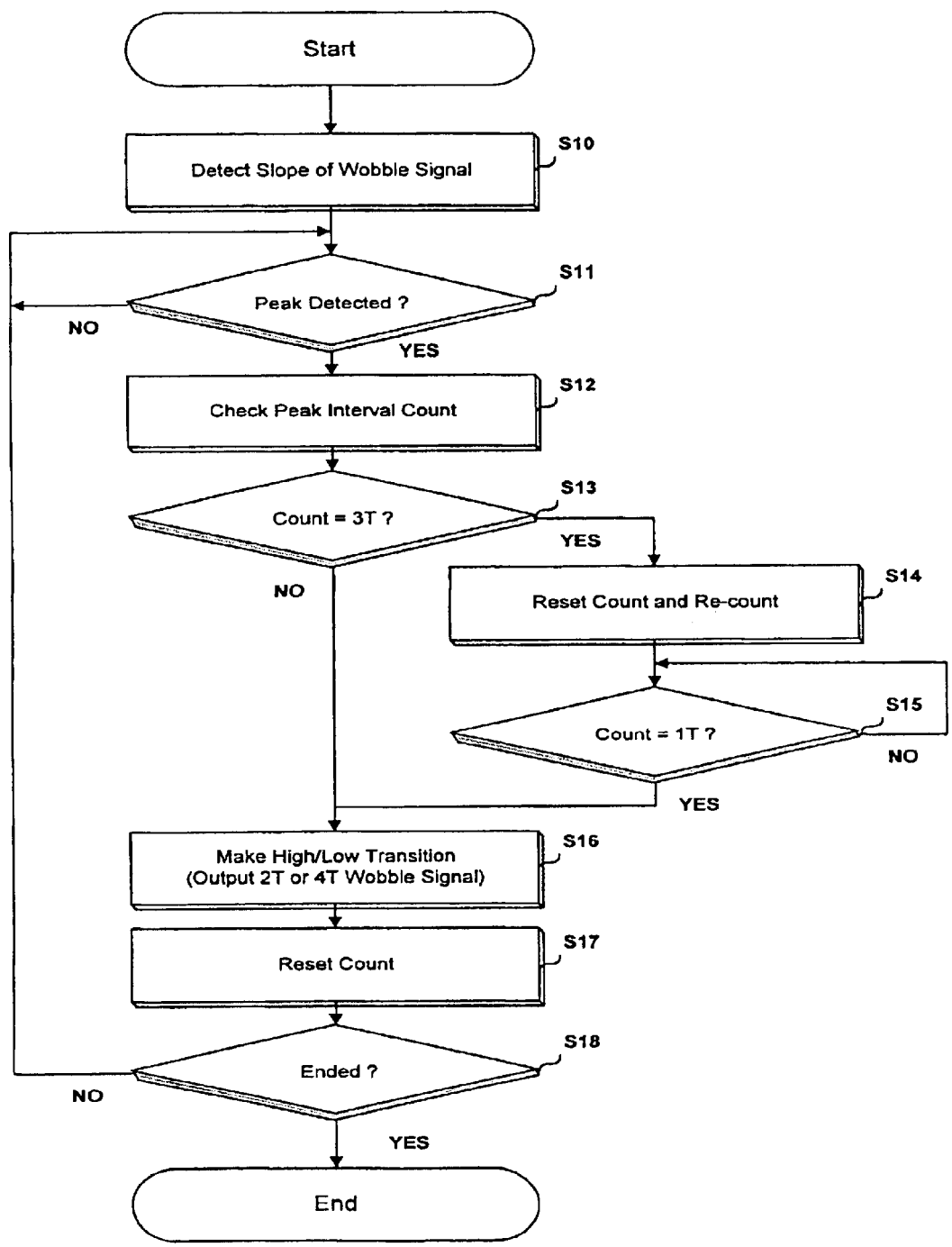
FIG. 17 is a flow chart illustrating a wobble signal detection method in accordance with the second embodiment of the present invention.

FIG. 17 is a flow chart illustrating a method for detecting a wobble signal read from an optical disc in accordance with the second embodiment of the present invention.

First, the wobble signal detector 30 detects a slope of an output digital wobble signal from the A/D converter 11 (step S10) and continuously performs a peak detection operation of detecting a peak point of the digital wobble signal based on the detected slope. If a peak point of the wobble signal is detected (step S11), then the wobble signal detector 30 checks a value frequency-counted beginning with the previously detected peak point (step S12).

For example, upon detecting a Kth peak point $P_K$ by monitoring the slope of the digital wobble signal, the wobble signal detector 30 checks a value frequency-counted beginning with the previously detected (K−1)th peak point $P_{K-1}$.

In the case where the checked frequency-counted value is a bit length of an integer multiple of 3, for example, a 3 T length (step S13), the wobble signal detector 30 resets the counted value and then resumes the counting operation (step S14). Thereafter, if the re-counted value becomes a 1 T length (step S15), then the wobble signal detector 30 makes a high or low level transition at that time point.

Figure 18:
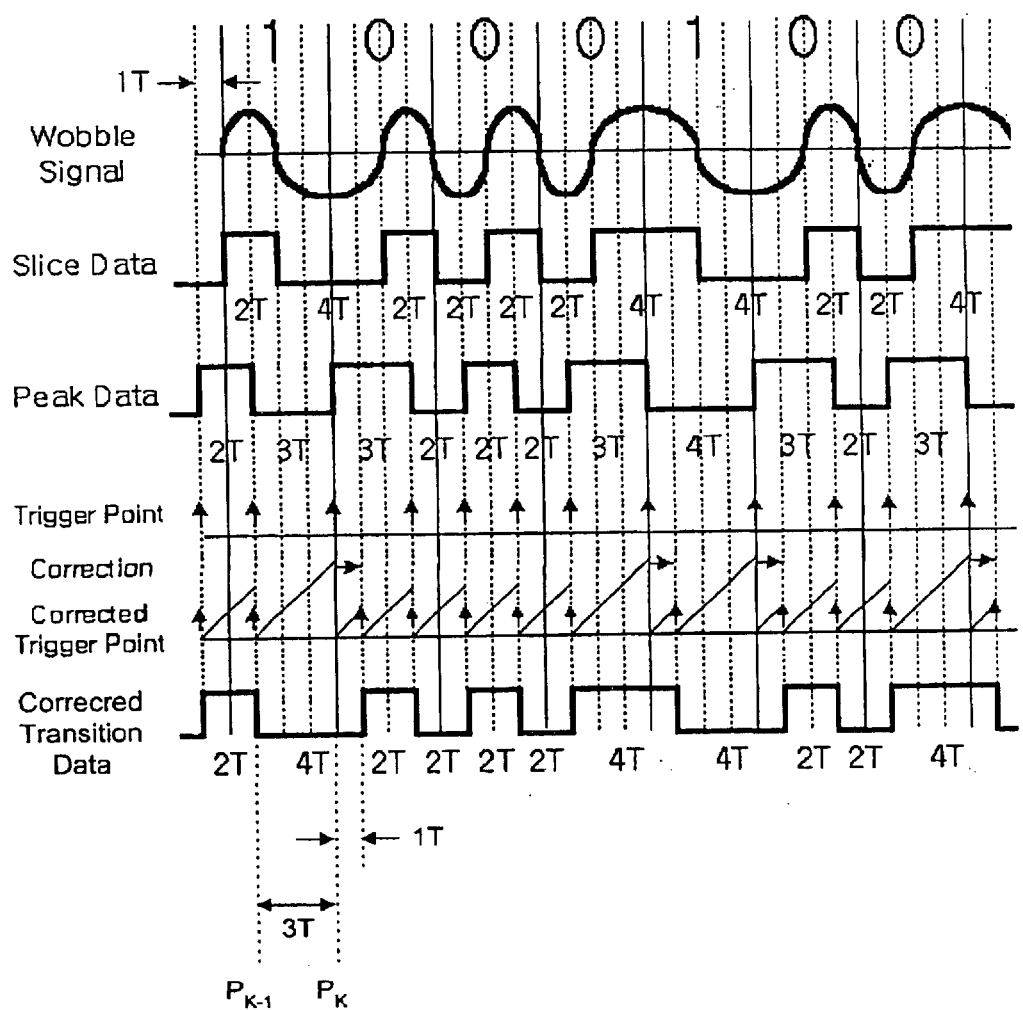
FIG. 18 is a waveform diagram illustrating a process of detecting a wobble signal with a level transition in the wobble signal detection method in accordance with the second embodiment of the present invention.

In other words, in the case where a frequency count increasing from the (K−1)th peak point $P_{K-1}$ to the Kth peak point $P_K$ has a value corresponding to the 3 T length, as shown in FIG. 18, the wobble signal detector 30 generates no trigger point for a level transition, initializes the frequency count to zero, and then performs the re-counting operation.

Thereafter, when the frequency re-count has a value corresponding to the 1 T length at the above step S15, the wobble signal detector 30 generates a trigger point so as to make a high level transition of a 4 T length corresponding to an integer multiple of 2 (step S16). At this time, the wobble signal detector 30 makes a high level transition when the digital wobble signal slope at the Kth peak point $P_K$ changes from negative to positive. Alternatively, the wobble signal detector 30 makes a low level transition when the digital wobble signal slope at the Kth peak point $P_K$ changes from positive to negative.

On the other hand, in the case where the checked frequency-counted value is a bit length of an integer multiple of 2, for example, a 2 T or 4 T length at the above step S13, the wobble signal detector 30 generates a trigger point for a level transition so as to make a high/low level transition (step S16). Thereafter, the wobble signal detector 30 resets the frequency-counted value to zero (step S17) and then repeats the above operation according to whether the system is ended (step S18).

Therefore, the wobble signal detector 22 detect/outputs a square-wave wobble signal with a pulse width of a bit length of an integer multiple of 2, for example, the 2 T or 4 T length, thereby enabling the address decoder 18 to perform the address decoding operation in a simpler manner.

For example, as shown in FIG. 18, when a level transition is made on the basis of a point of peak detection time, a wobble signal is detected/outputted in the form of peak data with 2 T, 3 T and 4 T lengths. In this case, the address decoding operation must be performed at a length of ½ T which is the greatest common factor of 2 T, 3 T and 4 T, thereby making the address decoder 18 complicated in construction. However, the wobble signal detector 30 enables the address decoder 18 to perform the address decoding operation at a length of 2 T which is the greatest common factor of 2 T and 4 T, so the address decoder 18 can become simpler in construction.

Figure 19:
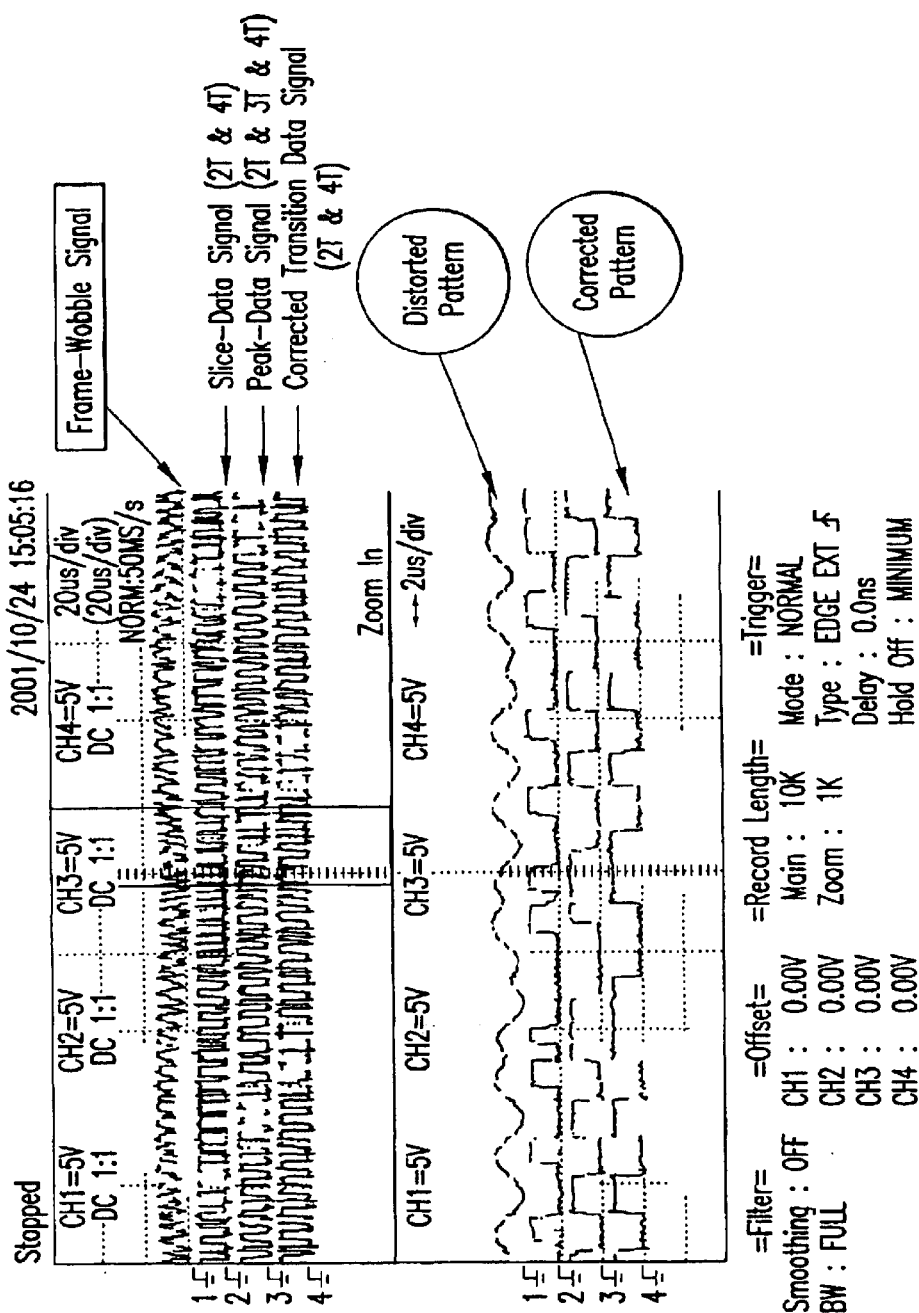
FIG. 19 is a waveform diagram illustrating the comparison between a wobble signal detected by the wobble signal detection method in accordance with the second embodiment of the present invention and wobble signals abnormally detected by conventional wobble signal detection methods.

As seen from FIG. 19, in the case where a digital wobble signal A/D-converted by the A/D converter 11 has a distorted pattern containing a low-frequency fluctuation component, an amplitude variation, etc., a wobble signal (Slice Data Signal) detected/outputted by a conventional slice detection method is an abnormal square-wave wobble signal which has a pulse width of a 2 T or 4 T length, but is discontinuously interrupted due to the amplitude variation, etc. Also, a wobble signal (Peak Data Signal) detected/outputted by a conventional peak detection method is a square-wave wobble signal which is stable regardless of the amplitude variation, etc., but has a pulse width of a 2 T, 3 T or 4 T length, thereby complicating the address decoding operation.

On the other hand, a wobble signal (Corrected Transition Data Signal) detected/outputted by the peak detection & transition correction method according to the second embodiment of the present invention is a square-wave wobble signal which is stable irrespective of the amplitude variation, etc. and has a pulse width of the 2 T or 4 T length facilitating the address decoding operation.

As apparent from the above description, the present invention provides an apparatus and method for detecting a stable wobble signal even though a low-frequency fluctuation component and DC offset component are introduced into an analog wobble signal read from an optical disc or the analog wobble signal varies, in amplitude. Further, according to the present invention, an address decoder for decoding a physical address of the optical disc can be made simpler in construction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wobble signal detection apparatus comprising:
   analog/digital (A/D) conversion means for A/D-converting an analog wobble signal, read from an optical disc and then band pass filtered;
   slope detection means for detecting a slope of the A/D-converted wobble signal according to a variation thereof; and
   wobble signal detection means for detecting a peak point of said A/D-converted wobble signal using the detected wobble signal slope, and detecting/outputting a square-wave wobble signal with a high level or low level transition at the detected peak point;
   said slope detection means calculating variations of data values of said A/D-converted wobble signal sampled within a predetermined period on the basis of predetermined different weights, accumulating the calculated values and detecting the slope of said A/D-converted wobble signal on the basis of the accumulated value, said predetermined period being an interval where at least two wobble signal data samples are obtained.

2. The wobble signal detection apparatus as set forth in claim 1, wherein said slope detection means is adapted to compare each of said wobble signal data values sampled within said predetermined period with an arbitrary reference wobble signal data value, obtain the respective differences as a result of the comparisons, multiply the obtained differences by said different weights, respectively, accumulate the multiplied values, compare the accumulated value with a predetermined positive threshold value for positive slope detection and a predetermined negative threshold value for negative slope detection, respectively, and detect/output a positive slope and negative slope of said wobble signal accordance with the compared results.

3. The wobble signal detection apparatus as set forth in claim 2, wherein said weights are preset to different values increasing in proportion to time differences or spaced distances between said reference wobble signal data value and said sampled wobble signal data values.

4. The wobble signal detection apparatus as set forth in claim 2, wherein said reference wobble signal data value is a first one of said wobble signal data values sampled within said predetermined period.

5. The wobble signal detection apparatus as set forth in claim 2, wherein said predetermined period is set by a window having a certain length corresponding to said interval where at least two wobble signal data samples are obtained.

6. The wobble signal detection apparatus as set forth in claim 5, wherein said slope detection means is adapted to shift said window such that said reference wobble signal data value is a second one of said wobble signal data values sampled within said predetermined period, and repeat the slope detection operation with respect to the shifted window.

7. A wobble signal detection method comprising the steps of:
   a) band pass filtering and A/D-converting an analog wobble signal read from an optical disc, and detecting a slope of the A/D-converted wobble signal;
   b) detecting a peak point of said A/D-converted wobble signal using the detected wobble signal slope; and
   c) detecting/outputting a square-wave wobble signal with a high level or low level transition at the detected peak point;
   said step a) of detecting the wobble signal slope including the step of comparing data values of said A/D-converted wobble signal sampled within a predetermined period with an arbitrary reference wobble signal data value, respectively, obtaining the respective differences as a result of the comparisons, multiplying the obtained differences by different weights, respectively, accumulating the multiplied values, comparing the accumulated value with a predetermined threshold value, and detecting the wobble signal slope in accordance with the compared result.

8. The wobble signal detection method as set forth in claim 7, wherein said weights are preset to different values increasing in proportion to time differences or spaced distances between said reference wobble signal data value and said sampled wobble signal data values.

9. The wobble signal detection method as set forth in claim 7, wherein said reference wobble signal data value is a first one of said wobble signal data values sampled within said predetermined period.

10. The wobble signal detection method as set forth in claim 7, wherein said predetermined period is set by a window having a certain length corresponding to an interval where at least two wobble signal data samples are obtained.

11. The wobble signal detection method as set forth in claim 10, further comprising the step of:
    d), after deciding the wobble signal slope at said step c), shifting said window such that said reference wobble signal data value is a second one of said wobble signal data values sampled within said predetermined period, and repeating the slope detection operation with respect to the shifted window.

12. A wobble signal detection method comprising the steps of:
    a) band pass filtering an analog wobble signal read from an optical disc, and A/D-converting the filtered wobble signal into a digital wobble signal;
    b) detecting a peak point of the A/D-converted digital wobble signal;
    c) determining whether a counted value obtained by frequency-counting an interval between the detected wobble signal peak point and a just previously detected wobble signal peak point corresponds to a bit length of an integer multiple of 3; and
    d) initializing the counted value if it corresponds to the bit length of the integer multiple of 3, performing a re-counting operation, and detecting/outputting a square-wave wobble signal with a high level or low level transition at a point of time that a re-counted value corresponds to a desired bit length.

13. The wobble signal detection method as set forth in claim 12, wherein said step d) includes the step of, if said counted value obtained by frequency-counting said interval between the currently detected peak point and the just previously detected peak point corresponds to a 3 T length, initializing said counted value, performing the re-counting operation, and detecting/outputting a square-wave wobble signal having a pulse width of a 2 T or 4 T length by making a high level or low level transition at a point of time that a re-counted value corresponds to a 1 T length.

14. The wobble signal detection method as set forth in claim 12, further comprising the step of:
    e) detecting/outputting a square-wave wobble signal with a high level or low level transition at a point of time that said counted value obtained by frequency-counting said interval between the detected wobble signal peak point and the just previously detected wobble signal peak point corresponds to a bit length of an integer multiple of 2.

15. The wobble signal detection method as set forth in claim 14, wherein said step e) includes the step of detecting/ outputting a square-wave wobble signal having a pulse width of a 2 T or 4 T length by making a high level or low level transition at a point of time that said counted value obtained by frequency-counting said interval between the currently detected peak point and the just previously detected peak point corresponds to the 2 T or 4 T length, and then initializing said counted value.

16. The wobble signal detection method as set forth in any one of claims 12 to 15, wherein said level transition is a high level transition when a slope of said digital wobble signal at the currently detected peak point changes from negative to positive, and a low level transition when the digital wobble signal slope changes from positive to negative.

17. A wobble signal detection apparatus comprising:

A/D conversion means for A/D-converting an analog wobble signal, read from an optical disc and then band pass filtered;

slope detection means for detecting a slope of the A/D-converted wobble signal according to a variation thereof;

peak detection means for detecting a peak point of said A/D-converted wobble signal using the detected wobble signal slope;

counting means for frequency-counting an interval between the detected wobble signal peak point and a just previously detected wobble signal peak point; and level transition means for, if a counted value obtained by frequency-counting the interval between the detected wobble signal peak point and the just previously detected wobble signal peak point corresponds to a bit length of an integer multiple of 3, initializing the counted value, and making a high level or low level transition at a point of time that a re-counted value corresponds to a desired bit length.

18. The wobble signal detection apparatus as set forth in claim 17, wherein said level transition means is adapted to output a square-wave wobble signal having a pulse width of a 2 T or 4 T length by making a high level or low level transition at a point of time that said re-counted value corresponds to a 1 T length.

19. The wobble signal detection apparatus as set forth in claim 17, wherein said level transition means is adapted to output a square-wave wobble signal having a pulse width of a 2 T or 4 T length by making a high level or low level transition at a point of time that said counted value obtained by frequency-counting said interval between the detected wobble signal peak point and the just previously detected wobble signal peak point corresponds to a bit length of an integer multiple of 2.

20. The wobble signal detection apparatus as set forth in any one of claims 17 to 19, wherein said level transition means is adapted to make a high level transition when the digital wobble signal slope at the currently detected peak point changes from negative to positive, and a low level transition when the digital wobble signal slope changes from positive to negative.

* * * * *